(12) United States Patent
Bethune et al.

(10) Patent No.: US 7,839,421 B2
(45) Date of Patent: Nov. 23, 2010

(54) SYSTEM AND METHOD FOR PROCESSING MAP DATA

(75) Inventors: Christopher Bethune, Scarborough (CA); Ryan Eccles, Toronto (CA); Tom Kapler, Toronto (CA)

(73) Assignee: Oculus Info Inc., Toronto (CA)

( * ) Notice: Subject to any disclaimer, the term of this patent is extended or adjusted under 35 U.S.C. 154(b) by 0 days.

(21) Appl. No.: 12/466,510

(22) Filed: May 15, 2009

(65) Prior Publication Data

US 2010/0007669 A1 Jan. 14, 2010

Related U.S. Application Data

(63) Continuation of application No. 11/333,298, filed on Jan. 18, 2006, now Pat. No. 7,551,182.

(60) Provisional application No. 60/644,033, filed on Jan. 18, 2005.

(51) Int. Cl.
*G09G 5/00* (2006.01)
*G09G 5/02* (2006.01)
*G06T 15/00* (2006.01)
*H04N 1/46* (2006.01)
*H04N 1/387* (2006.01)
*G06K 9/36* (2006.01)
*G06K 9/34* (2006.01)

(52) U.S. Cl. ........................ 345/619; 345/581; 345/630; 345/501; 345/522; 358/453; 358/538; 382/173; 382/282; 382/284; 382/305; 715/255; 715/700

(58) Field of Classification Search ....................... None
See application file for complete search history.

(56) References Cited

U.S. PATENT DOCUMENTS

2005/0057571 A1* 3/2005 Stevens ....................... 345/501
2005/0140694 A1* 6/2005 Subramanian et al. ...... 345/619

* cited by examiner

*Primary Examiner*—Wesner Sajous
(74) *Attorney, Agent, or Firm*—Gowling Lafleur Henderson LLP

(57) ABSTRACT

A system and method is provided for assembling graphics information as a graphics display for presentation on a visual interface, the graphics information including a plurality of image tiles stored in a data store. The system and method comprise a management module for receiving a graphics request message and for coordinating processing of a selected number of the image tiles to generate at least one representative image tile as the graphics display in response to the graphics request message. The system and method also comprise a graphics system coupled to the management module for receiving processing information from the management module to facilitate access to the selected number of the image tiles. The selected number of image tiles are processed as a combination to generate the least one representative image tile, such that the graphics system includes graphics hardware such as a GPU/VPU configured for processing the graphics information.

20 Claims, 14 Drawing Sheets

SYSTEM AND METHOD FOR PROCESSING MAP DATA (This application is a Continuation application of U.S. patent application Ser. No. 11/333,298, filed Jan. 18, 2006 in its entirety herein incorporated by reference, which claims the benefit of U.S. Provisional Application No. 60/644,044, filed Jan. 18, 2005 in its entirety herein incorporated by reference.)

The present invention relates to an interactive visual presentation of graphical data on a user interface.

BACKGROUND OF THE INVENTION

Internet GIS and Web mapping have been applied in homeland security, disaster management, business market, transportation, city planning, and K-12 educations. According to a recent research from ComScore Network ((http://www.e-brandz.com/newsletter/2005/July/1july_31july_article1.htm), online map users are a huge market. Currently, Time Warner's MapQuest.com had an estimated 43.7 million U.S. visitors in May 2005, the Yahoo! Maps had 20.2 million users, Google Map had 6.1 million users, and Microsoft's MSN MapPoint had 4.68 million visitors. This is a huge market for mapping services providing more diversified geospatial information services.

The maps presented by these web sites (and other mapping applications) are generated by a map server, a specialized application for the storage and retrieval of map and GIS data. The goal of a map server is to respond to requests for data with as low latency as possible. This requires the optimum use of the host computer's resources, such as memory, network bandwidth and processor usage.

When viewing satellite imagery, categorizing land use data, or comparing the changes of land cover before/after the disasters, traditional GIS applications and Web-based mapping tools can suffer from processing bottlenecks from system overload. This results in slow response times for users making map requests. Map servers attempt to avoid this by mitigating the effect of large image data sizes on the server hardware and client/server communications. Some map servers for generating 3D surface textures decrease the amount of map data in real time through the use of impostors and occlusion culling. This occlusion culling is done by using the current 3D scene viewpoint, which can be inefficient in the use of computer processing and network bandwidth when using a collection of tiles to represent the requested scene. Other techniques for reducing the load on the map server involve caching on either the client or the server end to allow for repeated queries to be fetched without having to search the server's database.

Map servers frequently deal with terabytes of image data. The initial loading of this data into the map server's database is a very computationally intensive process. The image data must be store in such a manner that it can be retrieved quickly when requested. This involves the use of a spatial database, which is a technique for indexing a data set such that it can be queried using physical dimension parameters such as location and spanning range. Loading image data into the spatial database involves intensive image processing operations such as slicing into tiles and pre-processing of data into image pyramids. These lengthy operations require heavy processor and disk utilization, essentially consuming all system resources until the loading is complete.

It is an object of the present invention to provide a graphics processing system and method to obviate or mitigate at least some of the above-mentioned disadvantages.

SUMMARY OF THE INVENTION

When viewing satellite imagery, categorizing land use data, or comparing the changes of land cover before/after the disasters, traditional GIS applications and Web-based mapping tools can suffer from the slow response and the lack of high resolution images because of the limitation of image data sizes and the network communications. Further, loading of multiple image segments or tiles by a requesting application can result in an increased use of processing and memory resources that can undesirably reduce the display response of requested map data. Contrary to current systems is provided a system and method for assembling graphics information as a graphics display for presentation on a visual interface, the graphics information including a plurality of image tiles stored in a data store. The system and method comprise a management module for receiving a graphics request message and for coordinating processing of a selected number of the image tiles to generate at least one representative image tile as the graphics display in response to the graphics request message. The system and method also comprise a graphics system coupled to the management module for receiving processing information from the management module to facilitate access to the selected number of the image tiles. The selected number of image tiles are processed as a combination to generate the least one representative image tile, such that the graphics system includes graphics hardware such as a GPU/VPU configured for processing the graphics information.

One aspect provided is a system for assembling graphics information as a graphics display for presentation on a visual interface, the graphics information including a plurality of image portions stored in a data store, the system comprising: a management module for receiving a graphics request message and for coordinating processing of a selected number of the image portions to generate at least one representative image portion as the graphics display in response to the graphics request message; and a graphics system coupled to the management module for receiving processing information from the management module to facilitate access to the selected number of the image portions and for processing them as a combination to generate the least one representative image portion, the graphics system including graphics hardware configured for processing the graphics information.

A further aspect provided is a method for assembling graphics information as a graphics display for presentation on a visual interface, the graphics information including a plurality of image portions stored in a data store, the method comprising the steps of: receiving a graphics request message; providing processing information for coordinating processing of a selected number of the image portions for inclusion in at least one representative image portion as the graphics display in response to the graphics request message; and accessing the selected number of the image portions and processing them as a combination to generate the least one representative image portion through use of graphics hardware configured for processing the graphics information.

BRIEF DESCRIPTION OF THE DRAWINGS

A better understanding of these and other embodiments of the present invention can be obtained with reference to the following drawings and detailed description of the preferred embodiments, in which.

DETAILED DESCRIPTION OF THE PREFERRED EMBODIMENTS

System 8 Overview

Figure 1:
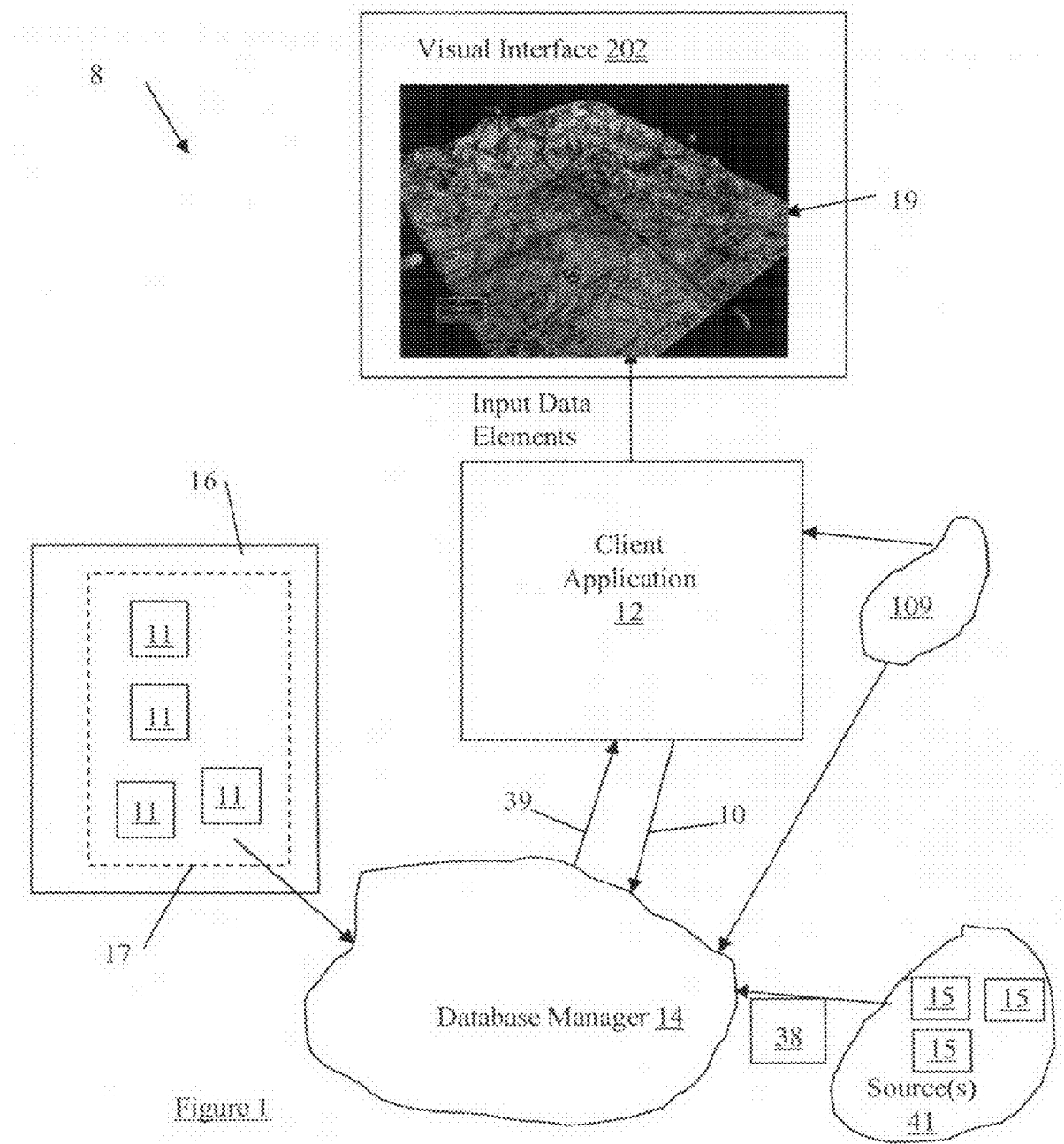
FIG. 1 is a block diagram of a data graphics processing.

Referring to FIG. 1, a graphics delivery system 8 includes a client application 12 (e.g. a visualization tool) for manipulating a collection of data objects 15 stored in a data store 16 as tiles 11 (otherwise referred to as image segments or portions). The tiles represent geographic region portions and associated information of a complete geographic data set 17, are used as input for map-based and associated data elements supplied to a visual interface 202, and are stored as a series of layers 200 (see FIG. 6), as further described below. The geographic data set 17 can include data object 15 types such as but not limited to imagery, terrain, vector, and annotation for both aerial- and satellite-based images. Selected ones of the tiles 11 from the complete geographic data set 17 are combined by a data store manager 14, as further described below, to generate a desired visual representation 19 of the geographic data set 17 (or portion thereof) on the visual interface 202. The graphical information included in the visualization representation 19 is provided to the application 12 in a visualization retrieval message 39 (or series of retrieval messages 39) from the data store manager 14, in response to a graphics request message 10 (or series of request messages 10). It is recognized that the graphical information can be configured in the retrieval message 39 as at least one scene representative tile 70. Communication of the retrieval 39 and request 10 messages can be facilitated using Simple Object Access Protocol (SOAP), JavaScript, or similar XML-based web service protocols, for example.

Using the tiles 11 communicated as the scene representative tile 70 (see FIG. 3), the application 12 can select a plurality of graphical information (e.g. visual elements) from the complete geographic data set 17, such as but not limited to elements including: a desired geographic region (e.g. subset of the geographic region contained in the geographic data set 17); three-dimensional visual characteristics including terrain elevation details and elevation details for structures positioned with respect to the domain; a selected display resolution; information (e.g. alpha-numeric information and other graphical symbols including points, lines, shapes, images, and 2D, 3D models) for overlay on the desired geographic region; and/or visual enhancements (further described below). Examples of the overlay information can include information such as but not limited to realtor market info, superposition of translucent satellite images on top of raster map data, hyspso-graph and light map data, GPS tracking, and/or user defined business data. Display of the tiles 11 and related data objects 15 are driven by user events 109 by a user (not shown) via a user interface 108 (see FIG. 2) during interaction with the visual representation 19 by the application 12. It is recognized that the display of the scene representative tile 70 could also be automated or semi-automated, as desired. The data store manager 14 also facilitates generation of the tiles 11 from input data files 38 obtained from data sources 41. It is recognized that the data files 38 could be obtained from local storage (e.g. a storage 102, see FIG. 2, such as a disk drive) or from a remote storage via a network (not shown).

Figure 2:
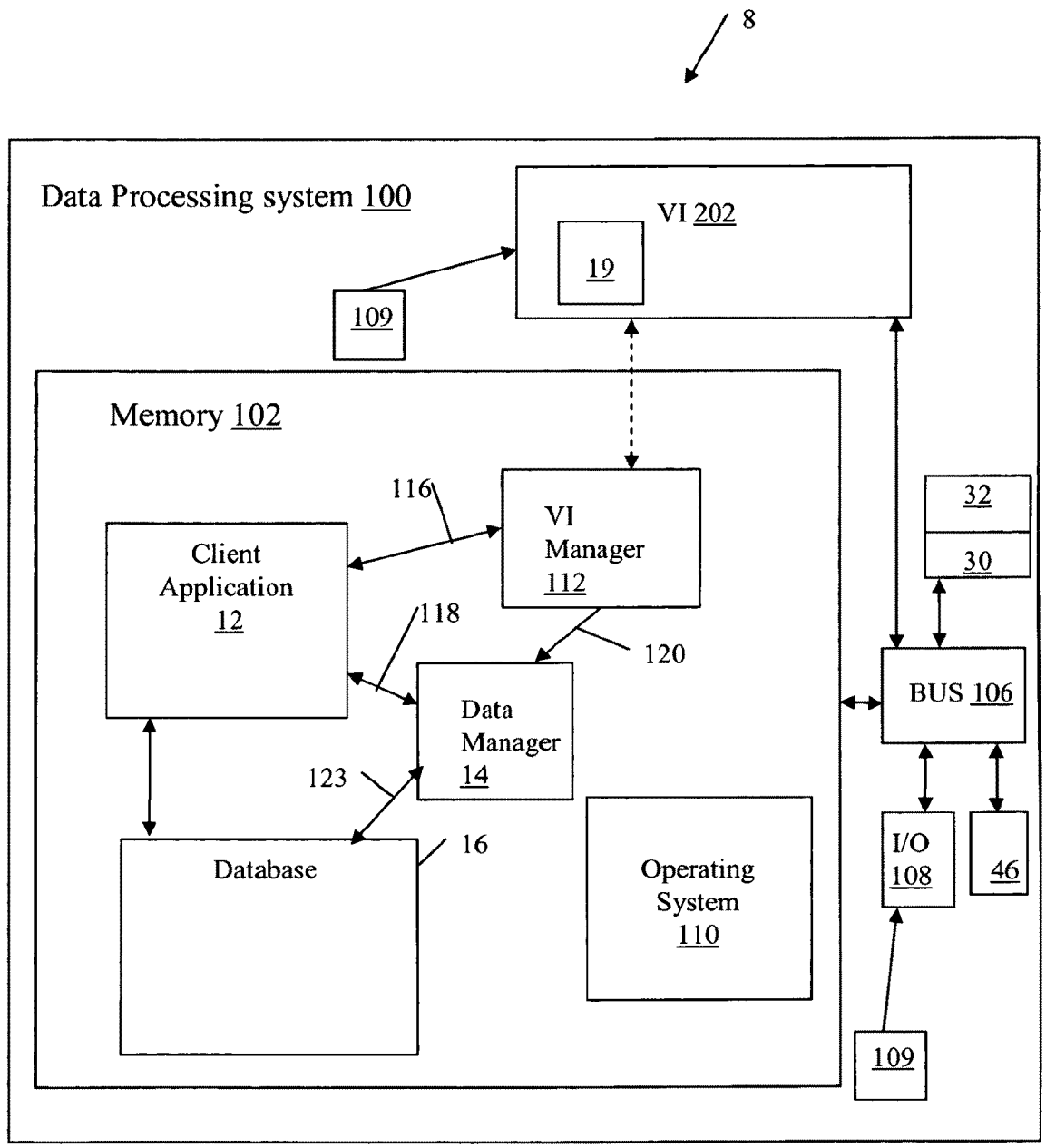
FIG. 2 shows further details of a data processing system of the system of FIG. 1.

Referring to FIG. 2, an example embodiment of a visualization data processing system 100 (of the system 8) has the user interface 108 for interacting with the application(s) 12, such that the user interface 108 is connected to a memory 102 via a BUS 106. The interface 108 is also coupled to a processor 30 (e.g. CPU) and graphics system 32 (including specialized graphics processing hardware such as a GPU, software for programming certain components of the GPU, or a combination thereof) via the BUS 106, to interact with the user events 109 to monitor or otherwise instruct the operation of the application 12 and data store manager 14 via an operating system 110, as well as provide for interaction between the application 12 and the data store manager 14 as further described below. It is recognized that generation, processing, and/or manipulation of the tiles 11 can be shared by the computing capabilities of both the processor 30 and the graphics system 32, such as when the data store manager 14 and client application(s) 12 are hosted on the same data processing system 100. The user interface 108 can include one or more user input devices such as but not limited to a QWERTY keyboard, a keypad, a track wheel, a stylus, a mouse, and a microphone. The visual interface 202 is considered the user output device, such as but not limited to a computer screen display. If the screen is touch sensitive, then the display can also be used as the user input device as controlled by the processor 104. Further, it is recognized that the data processing system 100 can include a computer readable storage medium 46 for providing instructions (e.g. software upgrades) to the processor 30, the graphics system 32 and/or the application 12 and the data store manager 14. The computer readable medium 46 can include hardware and/or software such as, by way of example only, magnetic disks, magnetic tape, optically readable medium such as CD/DVD ROMS, and memory cards. In each case, the computer readable medium 46 may take the form of a small disk, floppy diskette, cassette, hard disk drive, solid-state memory card, or RAM provided in the memory 102. It should be noted that the above listed example computer readable mediums 46 can be used either alone or in combination.

Referring again to FIG. 2, the application 12 interacts via link 116 with a VI manager 112 (also known as a visualization renderer) of the system 100 for presenting the visual representation 19 on the visual interface 202. The application 12 also interacts via link 118 with the data store manager 14 of the system 100 to coordinate management of the tiles 11 stored in the memory 102. The data store manager 14 can receive requests for storing, retrieving, amending, or creating the tiles 11 via the application 12 and/or directly via link 120 from the VI manager 112, as driven by the user events 109 and/or independent operation of the application 12. Accordingly, the application 12 and managers 112, 14 coordinate the processing of tiles 11 and user events 109 with respect to the content of the visualization representation 19 displayed on the visual interface 202.

Architecture Overview of System 100

Figure 3:
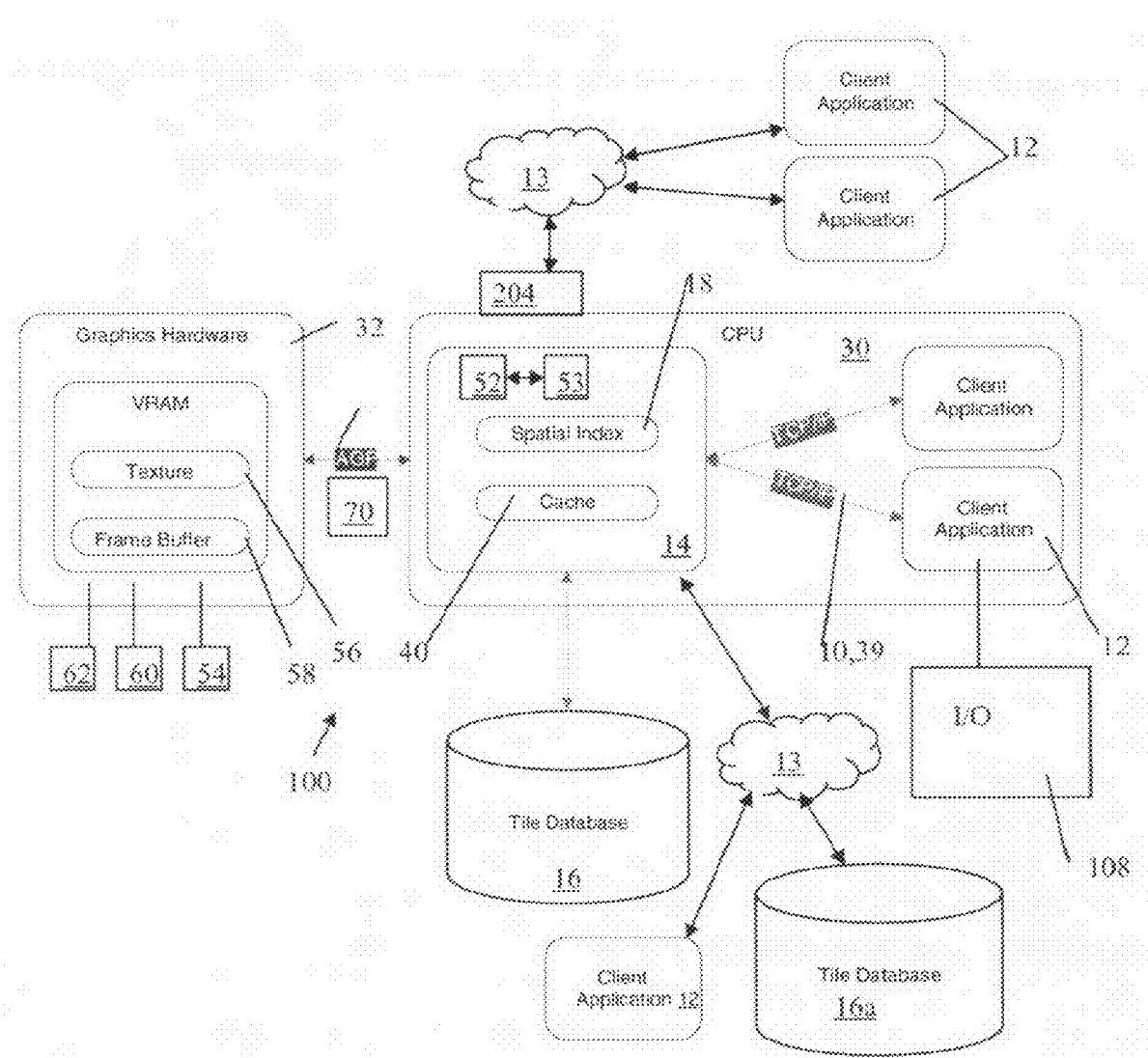
FIG. 3 shows further details of the processors and data store manager of FIG. 2.

FIGS. 2 and 3 shows a system 100 overview of the data store manager 14 amongst its associated components, namely the processor 30, the graphics system 32, the memory 102, and an I/O user interface 108. The request 10 and retrieval 39 messages for graphics data (e.g. portions of a map with associated information) are intended to be performed in a black-box fashion, for example, to help increase simplicity and allow for multiple client applications 12 to connect to the data store manager 14, which acts as an access service for the data store 16. Communication between the data store manager 14 and the client applications 12 can be done locally when hosted on the same computer (e.g. data processing system 100—see FIG. 2) or remotely with applications 12 networked with the data store manager 14 via a network 13.

Graphics System 32

Referring again to FIG. 3, the graphics system 32 is used by the data store manager 14 to offload data processing from the processor 30 related to the contents of the data store 16. The graphics system 32 (e.g. the Graphics Processing Unit or GPU also occasionally called a Visual Processing Unit or VPU) manipulates and facilitates display of computer graphics involving mathematically-intensive tasks (e.g. matrix and vector operations), and are suited for data processing using a range of complex algorithms, i.e. for computing 3D functions including lighting effects, object transformations, and 3D motion as well as stream computing. Use of the graphics system 32 by the data store manager 14 can lift computing burden from the processor 30 to help free up processor 30 cycles that can be used for other jobs, including operation of the application 12, operation of the data manager 14, and operation of the interfaces 108,202 for example. Computing done by the graphics system 32 can include items such as but not limited to defining 2D rectangles, triangles, circles and arcs and their 3D computer graphic equivalents, as well as digital video-related functions.

The graphics system 32 can accelerate the memory intensive work of combining the tiles 11 to generate the representative tile 70 such as but not limited to; texture mapping and rendering polygons, geometry calculations such as mapping vertices into different coordinate systems, support for hard-wired/programmable shaders which can manipulate vertices and textures, over-sampling and interpolation techniques to reduce aliasing, and high-precision color formats. The graphics system 32 can include basic 2D acceleration and frame buffer 58 (containing on-screen and/or off-screen buffering as desired) capabilities (usually with a VGA compatibility mode), can support the YUV color space and hardware overlays (used for digital video playback), and can support MPEG primitives like motion compensation and iDCT. It is recognized that the graphics system 32 can sits on a separate graphics card from the motherboard of the data processing system 100, connected to the processor 30 memory 102 through the bus 106. On the other hand, many motherboards have integrated graphics system 32 that uses the main memory 102 as a frame buffer.

Figure 13:
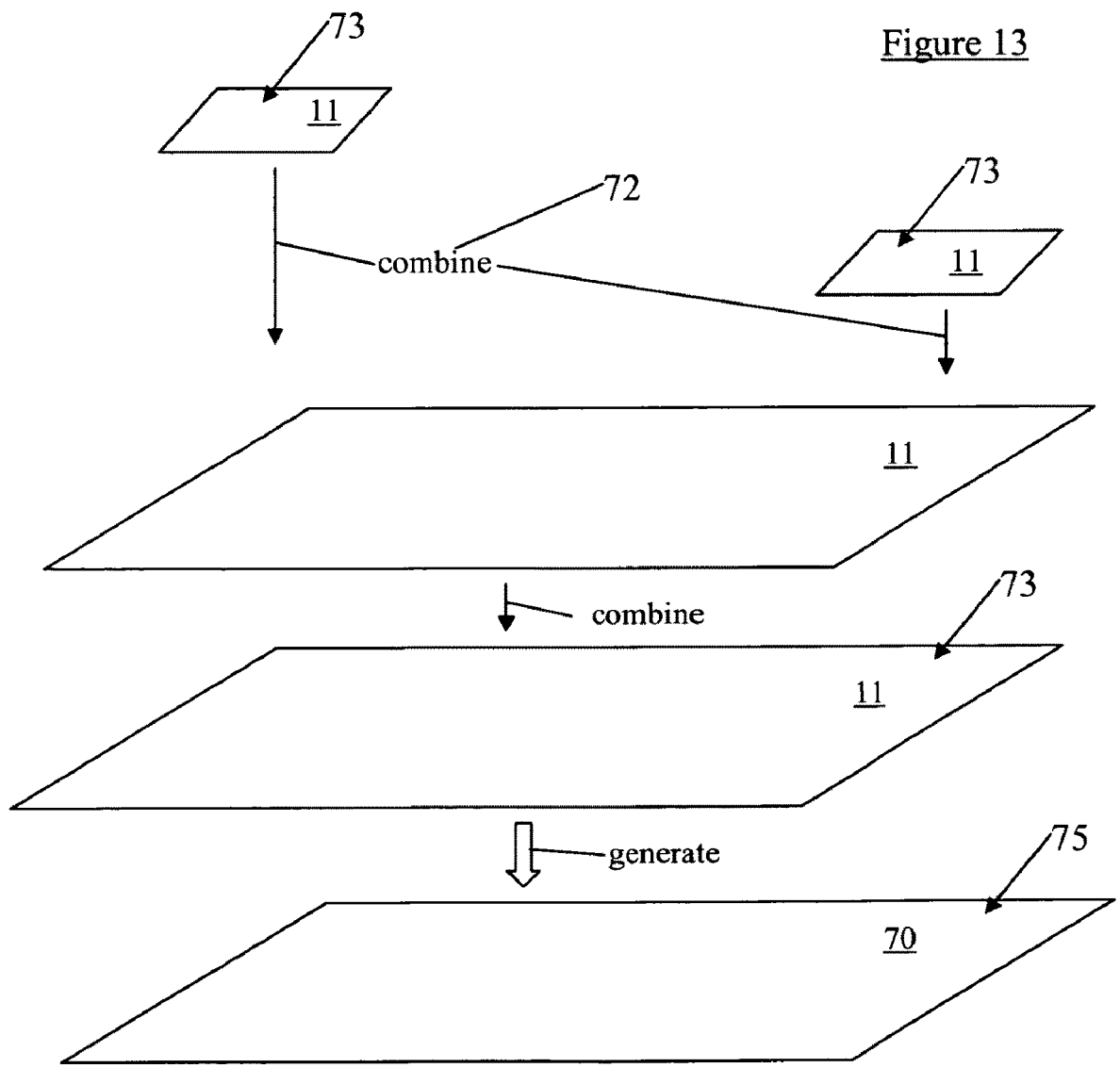
FIG. 13 is an example combination of the tiles of FIG. 6 to produce the representative tile.

The graphics system 32 has generic graphics hardware 54 resources for implementing general graphics data processing. The graphics system 32 also has a texture module 56 for providing texture creation/modification of graphics data, a pixel shader module 60 for shading operations applied to a stream of pixels included in the tiles 11, and a rendering module to assist in filtering techniques. It is recognized that the graphics system 32 is responsible for combining (e.g. adding, subtracting, or otherwise modifying) a selected portion 72 of the tiles 11 from the data store 16, by combining respective pixels 73, to generate the representative tile 70 (or a number of representative tiles 70) including the combined pixels 75 (as shown by example in FIG. 13).

Data store Manager/Module 14

Referring to FIGS. 2 and 3, the data store manager 14 includes a spatial index 18 for storing metadata 202, or other structured definitions for defining data, (see FIG. 6) associated with the tiles 11 to facilitate retrieval of selected tiles 11 upon request from the data store 16. The metadata 202 stored in the spatial indices 18 can relate each leaf in a treed data structure to the filename of its corresponding tile 11. For example, from a black-box viewpoint, querying the indices 18 returns the filename of each tile 11 that is required to span the requested geographic region of the retrieval message 10.

For example, the metadata 202 is defined in a structured definition language (e.g. XML) and is used to relate adjacent tiles 11 in the same layer 200 to one another, e.g. named in a sequential order. The metadata 202 is used to store the entire geographic data set 17 in the data store 16 as tile-based pyramidal data (for example) in an associated hierarchical indexed format, as further described below. The data store manager 14 also includes a layer management module 52 (e.g. an indexing module) for generating the layers 200 (see FIG. 6) from the source data files 38. The module 52 can also determine/provide the appropriate image set (e.g. selected tiles 11 from respective layers 200) in the retrieval 39 message in response to the requesting application 12 for a suitable level of detail for the visualization representation 19. It is recognized that the module 52 can access already generated layers 200 (stored in the data store 16) via the spatial index 18 and/or access via the spatial index 18 and dynamically generate modifications to stored layers 200 to take into account varying levels of detail/resolution associated with the request message 10, for example.

Further, the module 52 can communicate with an access module 53 to determine the allowed level of detail of the graphics data suitable for display on the visual interface 202. The access module 53 is used to determine permissions (e.g. according to application 12 identification information and/or user identification of the application 12 user—such as login and password information) of the application 12 submitting the request message 10. These permissions and/or level of detail (e.g. resolution) of the graphics data (of the tiles 11) can be contained in the request message 10, predefined by the system 8 in a corresponding permissions table and a level of detail table (not shown) accessible by the data store manager 14 and/or application 12, already known by the data store manager 14, or a combination thereof. Based on the determined permission(s), the data store manager 14 coordinates the content of the retrieval message 39 to contain the requisite level of detail in the combination of tiles 11 provided as the representative tile 70. It is recognized that the module 52 can increase or decrease the level of detail of the graphics data in the retrieval message 39 by substituting one layer 200 for another, adding or subtracting layers to one another, substitute selected tiles 11 in one layer 200 for other tiles 11 containing the desired/allowed level of detail, or a combination thereof, as further described below. Further, it is recognized that the functionality of the access module 53 can be incorporated into that of the module 52, as desired.

The data store manager 14 can also implement a cache 40 for recycling memory 102 resources among the currently/often used memory pages containing the tiles 11 that were already fetched from the data store 16 previously for use in generating earlier versions of the representative tile 70. For example, a major bottleneck when dealing with large tile data stores 16 can be the inherent slowness of reading tiles 11 from the physical medium of the data store 16 (e.g. a hard disk). The data store manager 14 can take advantage of the common task of panning around a contiguous geographic region (as opposed to jumping to a disparate region of the map) by caching recently used tiles 11 in the cache 40 to help limit the number of times the hard disk must be accessed when satisfying the request message 10 through assembly of the representative tile 70. The size of the cache 40 can be modified, but defaults for example to 1000 MB. Accordingly, given the tile 11 filenames retrieved from the spatial indices 18, the data store manager 14 checks if the tiles 11 are in the cache 40. If this is the case, the found tiles 11 are retrieved from the cache 40. If not, the data store manager 14 must load the tiles 11 from the data store 16.

Referring again to FIG. 3, an example embodiment of the data store manager 14 can be installed or otherwise downloaded at the start of a session (e.g. a web session) for viewing the geographic data set 17. For example, the data store manager 14 can be installed on the data processing system 100 as a graphics engine and could be responsible for facilitating both rendering the visual representation 19 the user sees and communicating with a remote data store 16a (provided by a networked data source) on the user's behalf. Further, the engine (e.g. data store manager 14) can allow the user's interaction with the data store 16a to happen asynchronously, in the case of the remotely accessed data store 16a, for example. Accordingly, the data store manager 14 can be employed as a local cache for the remote GIS data store 16a via network 13.

Graphics Pipeline 50

Referring to FIG. 3, a graphics data pipeline 50 is used to transfer graphics commands and other request parameters (e.g. processing information) from the data store manager 14 to the graphics system 32 as well as to transfer information about the resultant processed graphics data from the graphics system 32 to the data store manager 14. Accordingly, the data store manager 14 can act as an intermediary between the graphics system 32 and the client applications 12.

Processor 30

Referring to FIG. 3, the processor 30 is used for many functions, such as but not limited to coordinating operation of the data store manager 14, coordinating operation of the locally hosted applications 12 (including assistance in display of the visualization representation 19 on the visual interface 202), coordinating communication of the messages 10, 39, coordinating communication with remote applications 12 over the network 13 via a network interface 204, as well as assisting in graphics data processing for that processing not explicitly provided for by the graphics system 32 coupled to the data store manager 14 via the graphics pipeline 50.

Data store 16

Figure 6:
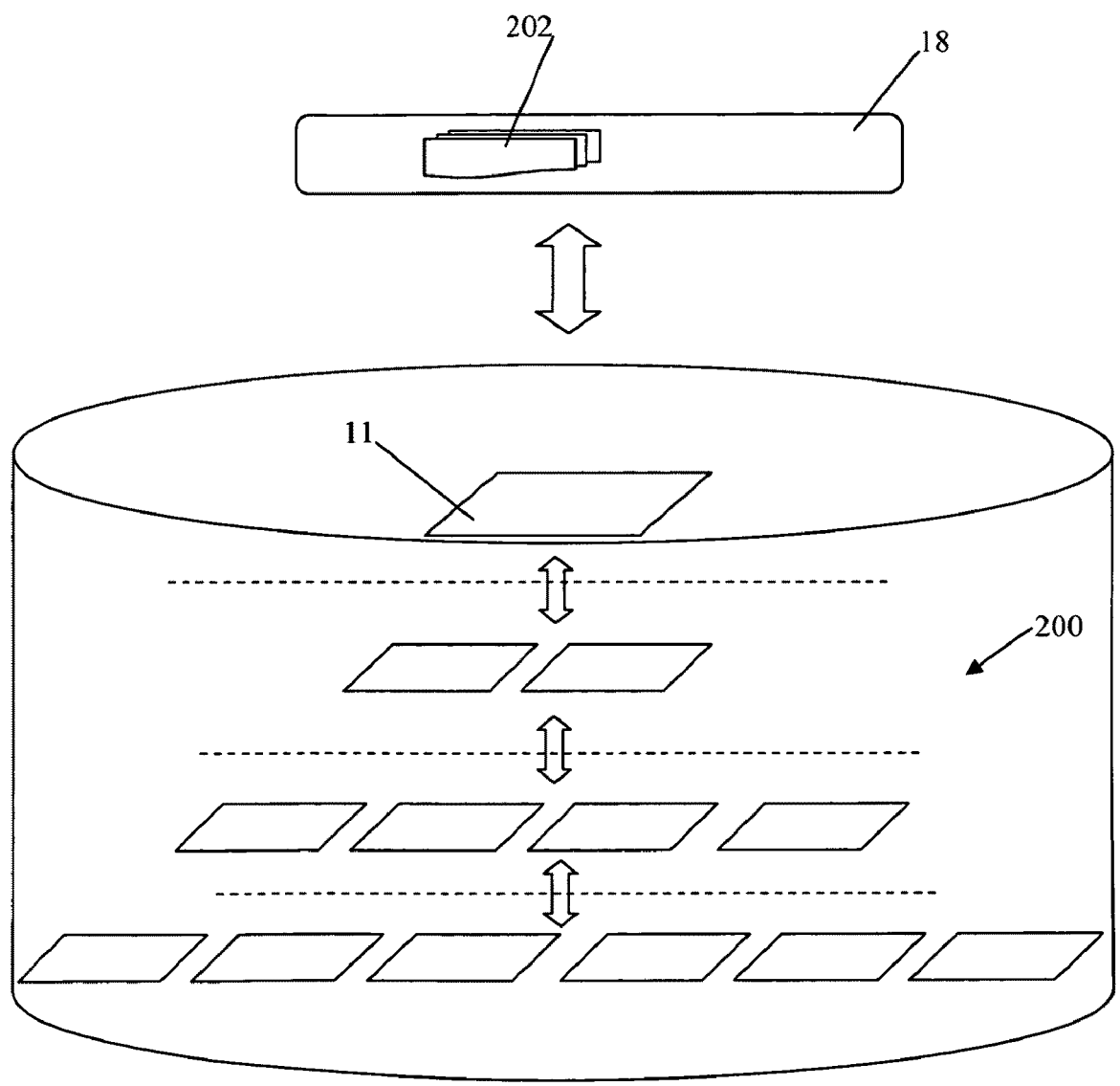
FIG. 6 shows an example layer structure for the tiles of FIG. 5.

Referring to FIGS. 3 and 6, the data store 16 (and/or remote data store 16a) is used to store the entire geographic data set 17 (e.g. representing imagery, terrain, vector, annotation data of a map for a number of different resolutions) as a plurality of layers 200, each comprising a number of tiles 11 representing a certain geographic sector/portion/region of the geographic data set 17. The data store 16 can be located locally in the memory 102 or remotely (i.e. data store 16a) via the network 13. For example, the data stores 16,16a can be accessed via TCP/IP or other communication protocols. It is recognized that the layers 200 can be used to represent various degrees of resolution of the geographic data set 17, as well as represent different overlays for selected geographic regions (e.g. selected annotation information—e.g. digital elevation models to visualize 3D spatial information). The use of tiles 11 to select specific regions of the geographic data set 17 allows the client applications 12 to represent only part of the geographic data image dynamically instead of the whole image representing the entire geographic data set 17. Further, use of the tiling 11 technique facilitates presentation of appropriate high/low resolution imagery and inhibits unnecessary computation/processing of off-display regions (i.e. absent from the region selected for display on the visual interface 202) of the geographic data set 17. It is recognized that the tiles 1 are used by the graphics system 32 as input graphs data to generate the representative tile 70.

Figure 5:
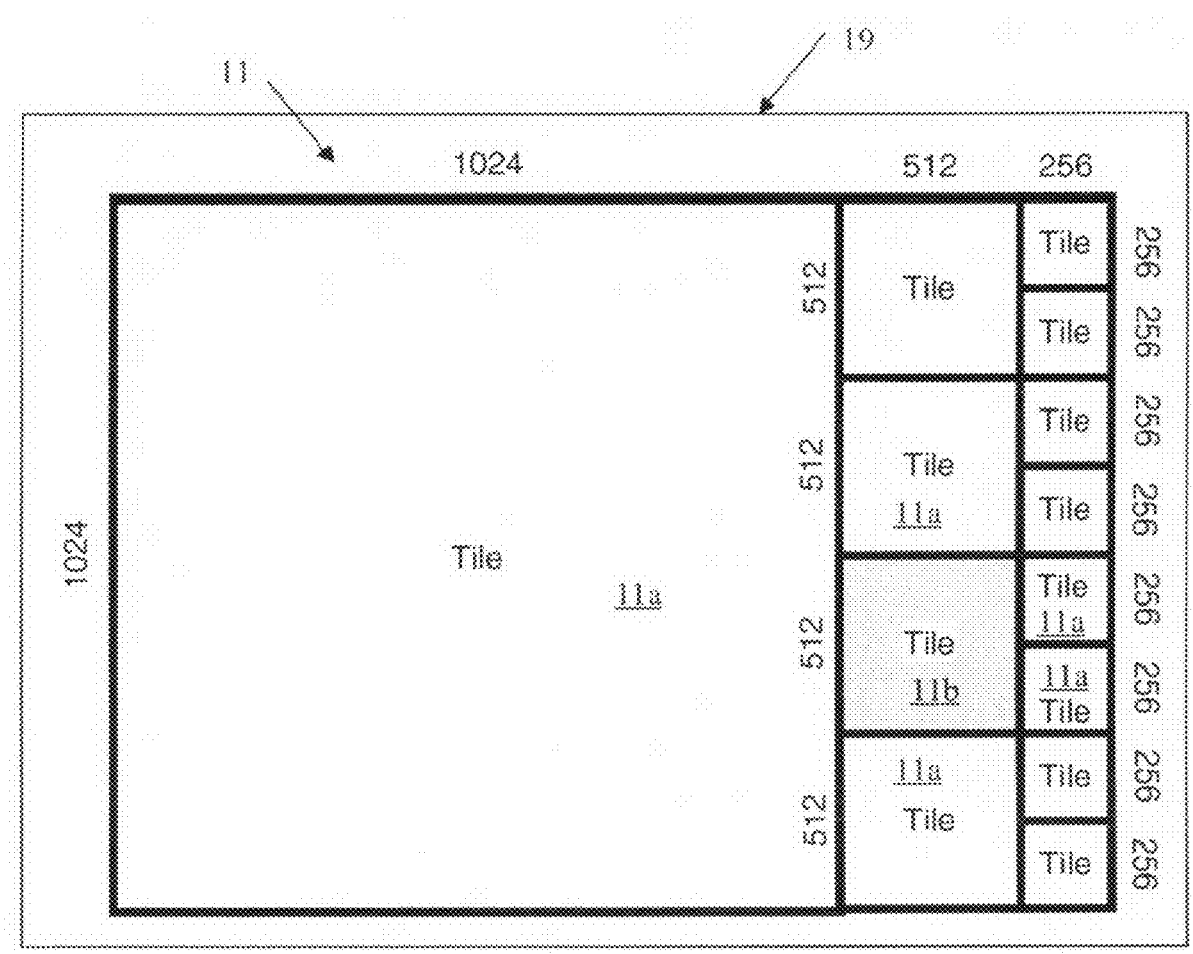
FIG. 5 is an example embodiment of tiles for a visualization representation of FIG. 1.

Referring to FIG. 5, for example, the application 12 can send the user request message 10 to the server (e.g. web) hosting the data store manager 14 to retrieve only the graphics data needed by the desired visualization representation 19. It is recognized that the level of detail in the graphics data (supplied in the retrieval 39 message) can be configured such that adjacent tiles 11a with a greater level of detail are combined by the graphics system 32 with a lower level of detail tile(s) 11b pertaining to a restricted access (e.g. supplied in the request message 10) spatial location in the terrain of the geographical data set 17.

Accordingly, the level of detail of individual/groups of tiles 11 within the layers 200 can be adjusted for use in the resultant representative tile 70 to provide selected or otherwise allowed resolution levels for the graphics data as well as the degree of information provided with the geographical details, e.g. to provide or to restrict certain visual features such as detailed displays of government buildings, military installations and other important sites. For example, the level of detail provided by the representative tile 70 in the retrieval message 39 can be adjusted by the data store manager 14 so as to in effect block images of vulnerable government buildings and others deemed sensitive/restricted sites (e.g. areas such as the presidential residence and defense installations) through the use of resolution images lower than surrounding areas of the geographic data set 17 to facilitate obscurement or blurring of images used to represent the selected portion of the geographic data set 17. It is also recognized that given the correct permissions the tile 11b could contain a greater (e.g. different) level of detail than the surrounding tiles 11a used to construct the representative tile 70, as desired.

Referring again to FIGS. 1, 2 and 3, accordingly, the total image content or data in the scene representative tile 70 interchanged between the client application 12 and data store manager 14 can be dynamically configured (increased or decreased). For example, if users of the application 12 need to zoom-in to a new map area in a map browser, the data store manager 14 would not need to reprocess the whole map page content (all map information contained in data store 16 for the requested map area) but only to include and then re-send in the scene representative tile 70 the smaller area of map requested by the user for the appropriate resolution level and requested map details (i.e. level of detail). In this case, the subsequently sent representative tile 70 would be used to overwrite the earlier sent representative tile 70 as the visualization representation 19. For example, the appropriate resolution level of the tiles 11 included in the representative tile 70 can either be requested by the user or be preset by the system 8 (e.g. due to configuration settings of the data store manager 14 and/or the application 12) according to the size of the geographic region requested in the request message 10. The use of tiles 11 and associated layers 202 in assembling the representative tile 70 can help prevent memory 102 overload, decrease processing of the associated graphics data, and decrease pipeline 50 (and network 13) bandwidth requirements, and facilitate efficient movement of terrain displayed in the visual representation 19 from one section of the geographic data set 17 to another. Accordingly, the interaction of the data store manager 14 and the graphics hardware 32 results in the assembly of the tiles 11 into one final direct x representative tile 70, which is returned to the client application 12 for presentment on the visualization interface 202.

Data Store Creation—Operation of the Module 52

Figure 4:
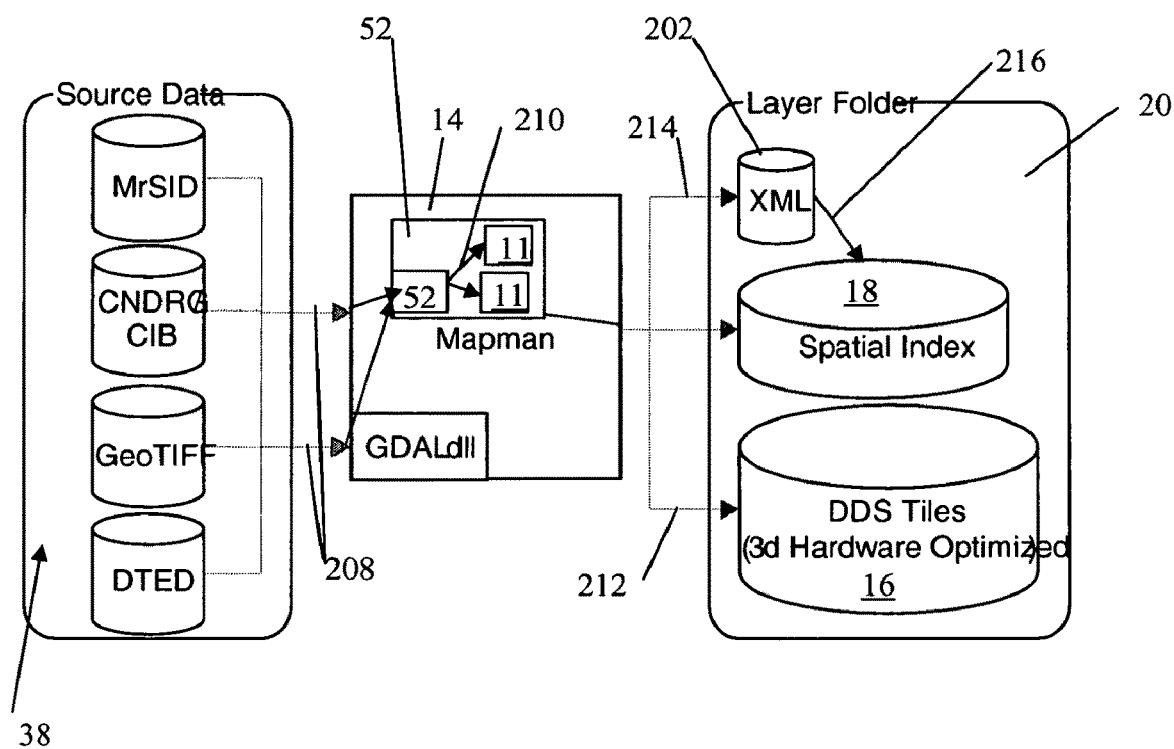
FIG. 4 shows details of a graphics data conversion into tiles of the system of FIG. 1.
Figure 14:
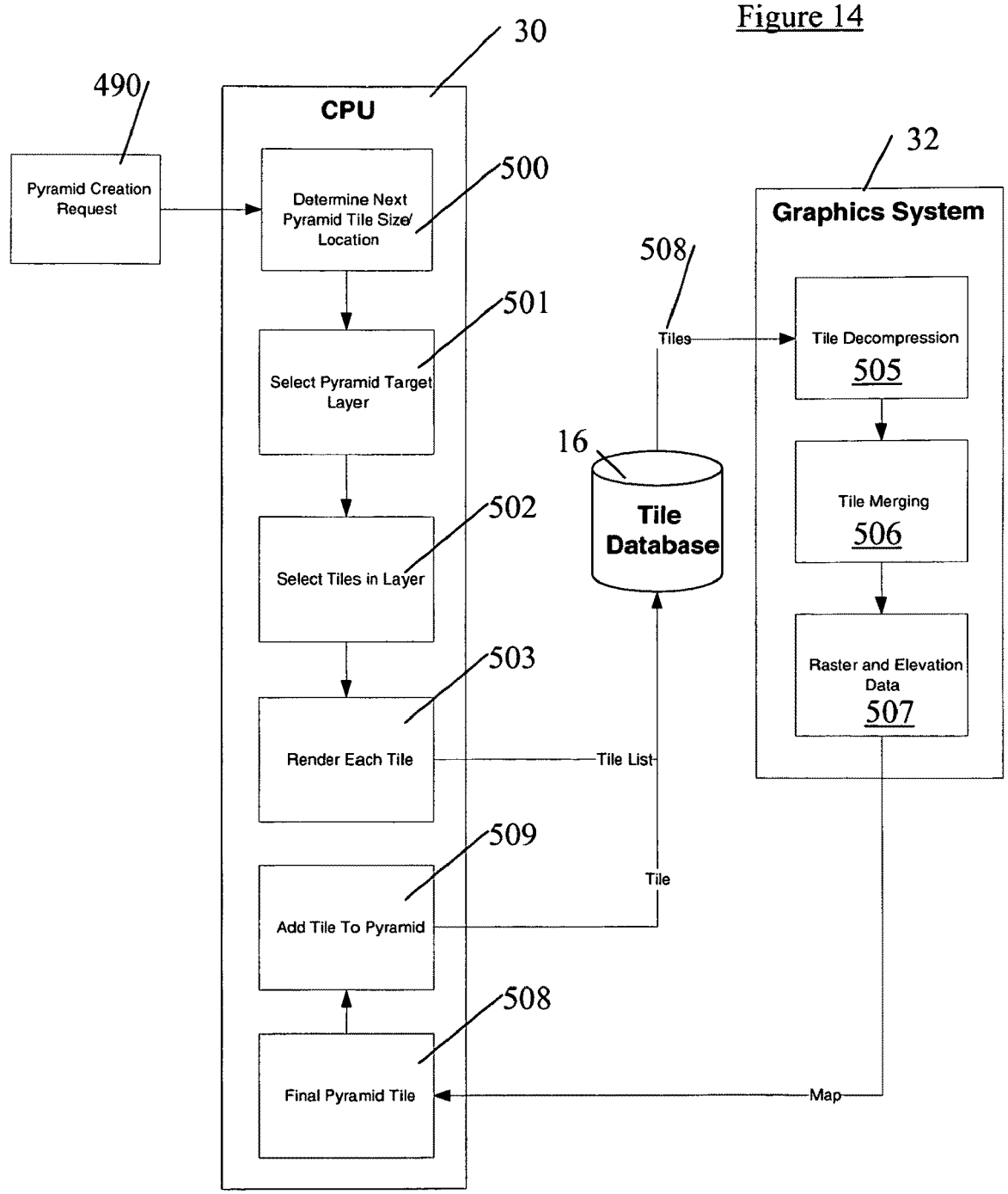
FIG. 14 shows an example operation of creating the image pyramid shown in FIG. 6.

Referring to FIGS. 3 and 4 and 14, the module 52 of the data store manager 14 can be used initially to generate and store the tiles 11 and respective layers 200 associated with the source data files 38 received from the sources 41. Further, the module 52 can be used to dynamically combine the available tiles 11 and corresponding layers 200 retrieved from the data store 16 for use in constructing the representative tile 70 to satisfy any request messages 10 received from the application(s) 12. Operation of the module 52 can include functionality such as but not limited to: rendering and display of global and local scale imagery, elevation, and vector-based datasets; rendering of multiple global and high resolution imagery and terrain data inserts; maintain selected level of detail represented in the tiles 11 while performing zoom functions; terrain morphing between resolution levels based on viewpoint and level of detail observable by the user of the visual interface 202; terrain scaling and tessellation bias control; facilitating level of detail calculations; and provision of translucent overlays and fade between datasets. The module 52 can also assist in tile 11 selection and dynamic modification of selected tiles 11 for deselecting and/or adding graphic objects in a scene for display on the visual interface 202. It is recognized that the computationally intensive operations can be performed by the graphics system 32 in the initial loading of the tiles 11 in the data store 16 (e.g. image pyramid creation), including in assisting of adding/removing tiles 11 from the data base 16.

Referring to FIGS. 3 and 14, a user of the database manager 14 requests 490 a pyramid be generated for a given layer 200 (see FIG. 6). The module 52 then determines 500 the number of pyramid levels that need to be constructed based on the coverage and resolution of the target layer 200. For each pyramid level, the module 52 creates a set of target request areas based on that level, the coverage area of the layer 200 being processed, and said area's resolution (in pixels).

The processing of the tiles 11 for loading in the data store 16 as a pyramid is shared between the processor 30 and the graphics system 32 such that each target request area is processed as follows:

Step 501—Select layer 200 (no ordering/pruning required, as we are guaranteed to work with one layer only);

Step 502—Select tiles 11 in layer 200 that lie within the target request area;

Step 503—Fetch tiles 11 from data store 16 (for example). The previously generated pyramid level can be used in order to speed up the rendering process;

Step 504—Send tiles to graphics system 32 for rendering;

Step 505—Decompress tiles 11;

Step 506—Merge tiles 11 (depth blending not required when only one layer 200 is being processed);

Step 507—Send produced raster or elevation data back to processor 30;

Step 508—Add raster/elevation data to the pyramid; and

Step 509—Update the data store 16 with the new pyramid tile information.

It is recognized that the above processing gets done for each level/layer 200 of the pyramid. It is recognized that by using previously generated pyramid levels 200 in the build process we greatly reduce the time taken to perform the build of the pyramid for a given layer 200.

Loading of Map Data

Referring to FIG. 4, loading source data file 38 imagery into the spatial data store 16 can be a computationally intensive task since the data store 16 may consist of terabytes of data, which must be parsed for geospatial information and converted into the tile 11 sets for optimized retrieval. The initial creation of the data store 16 is performed by the module 52 by firstly importing 208 source data files 38 from potentially a plurality of different source formats that include map data (e.g. raster image files with associated elevation information), and secondly by extracting 210 the geospatial data contained within as a series of tiles 11, and generating/converting the resultant tiles 11 to a file format known as Microsoft Direct Draw Surface (DDS) to allow for compression to be enabled, for example, for storing 212 in the data store 16. It is recognized that other file-formats (JPEG, PNG) can be used to offer higher compression ratios, as desired. However, it is recognized that DDS has a decompression algorithm that is implemented in hardware on the graphics system 32. For example, DDS can be used to provide the tiles 11 in a compressed image format with a compression ration of 4:1 for 32 bit data, and 6:1 for 24 bit data.

The extracting/creating step 210 performed by the module 52 includes creation of the standardized tiles 11 of dimensions 1024 pixels by 1024 pixels, for example. In situations where there aren't enough pixels to create the 1024×1024 tiles 11 (e.g. such as along an image border), the data store manager 14 can adapt the tile 11 size (e.g. continually try smaller tiles 11 with dimensions that are reduced by a power of two, for example, to provide a suitable tile 11 size that results in appropriate coverage of terrain represented by the geographic data set 17. This tile 11 resizing is repeated by the module 52 until the entire map data of the input data file 38 is broken into appropriately sized tiles 11, see FIG. 5). While the DDS format supports any image dimensions, graphics hardware can perform significantly better with images whose dimensions are a power of two.

In one embodiment, the geospatial data at step 210 is extracted from the input data file 38 by the data store manager 14 using GDAL (Geospatial Data Abstraction Library), which provides an open-source library for translating raster geospatial data formats. Further, an step 214 extracts the metadata 202 from each input data file 38 by the module 52 for later use in creating 216 the respective spatial index 18. The metadata 202 can also be used to store the required permission (e.g. access criteria) of the graphic information associated with the respective tile(s) 11 and/or complete layer 200 (or portion thereof) including the tile(s) 11, for later reference by the access module 53 further described below.

Storing Metadata 202 in a Hierarchical Data Structure

Each tile 11 in the data store 16 has associated metadata 202 that includes definitions of spatial coordinates or reference frame data sets (e.g. the latitude and longitude of the tile's 11 geographic span). When the data store manager 14 responds to the request message 10 for geographic data, the data store manager 14 locates the correct tiles 11 in the data store 16 that span the requested coordinates as represented in the index 18. Initially, upon loading the tiles 11 into the data store 16, each of the tile's 16 metadata 202 is stored by the manager 14 in the spatial index 18, using a hierarchical data structure (e.g. a KD Tree), in order to assist in tile(s) 11 retrieval. A KD Tree is a type of binary search tree for storing points in K-dimensional space. Creation of the data structure can be done by an $O(n \log n)$ algorithm, and can result in the data structure where points can be retrieved in $O(sqrt(n)+k)$, where n is the number of points in the tree and k is the number of points in the result.

Map Layers 200

When graphical data of the input data files 38 is initially loaded into the system 8 by the module 52, the respective tile 11 is assigned the layer 200 value (or a plurality of layer values if the graphic data content of the tile 11 is applicable to more than one layer). The assignment of the tile 11 to the layer 200 allows multiple layers 200 to be input for a single region of the geographical data set 17, e.g. one map layer 200 with road features, one layer 200 with terrain features, one layer 200 with landsat imagery, etc. . . . Each entry's layer 200 value is associated with the layer's 200 level of detail (e.g. resolution) of the information (e.g. terrain, imagery, vector, annotation) for presentment on the visualization representation 19 from the geographic data store 16 including the geographic data set 17. This helps the client applications 12 to request a specific level of detail when viewing map data, as obtained from the data store 16. The spatial index 18 is created by the module 52 for each layer 200, but every layer 200 may not contain an entry for each map location, due to varied input data file 38 sources. Further, it is recognized that the layers 200 can be use to provide varying levels of detail for a respective geographical region, as further described below. For example, the layers 200 can be used to provide varying degrees of spatial resolution for display on the visual interface 202 depending upon the viewing angle or point of view (e.g. degree of zoom such as street level as compared to city level) requested by the user of the application 12.

Each layer's spatial index 18, tile file system (e.g. data store 16) and the metadata 202 (e.g. XML definitions) are stored in a layer folder 20, which is accessible by the manager 14 (see FIG. 4). The metadata definitions 202 for each layer 200 can consist of the following values, such as but not limited to:

layerName—descriptive layer 200 name;
minzoom—Provides the minimum square kilometer request (or other area unit of measure) that this layer 200 will be visible. Requests with a square coverage less than this value will not be drawn;
maxZoom—Provides the maximum square kilometer request (or other area unit of measure) that this layer 200 will be visible. Request with a square coverage larger than this value will not be drawn;
blendIntensity—opacity value for alpha blending;
blendOp—the graphics processor 32 may provide different formula for blending pixels (e.g. a Porter-Duff blend and a Modulated color blend); and
blendOrder—used for sorting layers 200.

Further, referring to FIG. 6, it is recognized that in loading of the input data file 38 into the data store 16 through the creation of tiles 11, the module 52 can request a region that contains a 3×3, for example, tile 11 region but may be any reduction of the original tile 11 set. A new set of tiles 11 is generated using this technique recursively for each level of detail desired for storage in the data store 16 as successive level of detail layers 200. Each successive layer 200 builds the appropriate next part of the level of detail image pyramid 208 using the level of detail reduction (e.g. averaged pixels) from the previous layer 200. For example, the highest level in the image pyramid 208 may only contains a single tile representing the entire layer 200 at the lowest level of detail.

Module 52

Referring to FIGS. 3 and 6, in general, the image pyramid 208 (or other ordered association of layers 200 with varying levels of detail of respective tiles 11) is a performance improving feature designed to help reduce the number of rendered image tiles 11 provided to applications as well as to reduce the amount of graphic data content (e.g. level of detail) for rendering onto visual interfaces. For example, a 40000× 40000 pixel image representing the geographic data set 17 is broken up into 500×500 tiles, next pyramid level is same image sampled by 20000×20000 pixels, divided up into 250× 250 tiles, etc. . . . The tiles 11 will end up being bound by similar constraints described in the extracting/creating step 210. In the case of the graphics delivery system 8, the data store manager 14 (with the cooperation of the module 52 and the graphics system 32) coordinates assembly of the representative tile 70 for presentment to the applications 12 as a complete image for display on the visual interface 202. It is recognized that the applications 12 can maintain a list of the layers 200 available in the data store 16 as one of the parameters (e.g. processing information) specified in the request message 10.

It is recognized that data though-put of the data store manager 14 can be negatively impacted when excessive numbers of tiles 11 with redundant levels of detail must be loaded from the data store 16 to satisfy the retrieval request 10. For example, when a large area of a map is viewed, a system without image pyramids 208 would load all the necessary tiles 11 and render them in full detail in the representative tile 70, which is excessive if most of the graphics detail is not visible (e.g. individual buildings drawn to scale in a user selected view of a continental land mass) in the displayed visual representation 19. The image pyramid 208 comprises multiple layers 200 of varying levels of detail (e.g. pixel resolution), which can reduce the cost of loading images by creating adaptive levels of graphics detail in the resultant visual representation 19 dependant on the observable detail, according to a predefined detail parameter(s) associated with the retrieval message 10. As the layer 200 matching the level of detail desired by the retrieval message 10 is used by the module 52 in constructing the representative tile 70 for presentment on the visual interface 202. The data store manager 14 will select an appropriate sub-layer 200 to render from the layer pyramid 208 depending on the visible region of the geographic data set 17 requested in the retrieval message 10. When zoomed very close to the surface of the terrain of the geographical data set 17, the data store manager 14 will use the tile 11 set (e.g. selected number of the tiles 11) with the maximum level of detail originally obtained (for example) from the input data files 38. As the user moves away from the surface, the other sub-layers 200 with a lesser degree of detail will be chosen for satisfying the retrieval request 39.

Accordingly, the image tiling 11 technique can be adapted to store the geographic data set 17 as a series of layers 200, each providing a different degree of graphics data resolution that is either requested by the application 12 and/or preset by the data store manager 14 or other appropriate entity of the system 8. The large size image is first shrunk down (e.g. using pixel averaged smaller versions of the original texture map) by the module 52 to different resolutions for building multilevel image pyramid layers 200, and then each layer 200 is further broken into smaller tiles 11 in a separate file with a standard naming convention related to the specific tile 11 position. Alternatively, the previous layer 200 in the pyramid can be used to build the current layer, so that the original data doesn't have to be scaled down before it is broken up into the tiles 11. The tiles 11 are typically same size squares, for example, except where the visualization representation 19 width and height may not be exactly the integer multiples of the tile 11 width and height. The adjacent tiles 11 in the same layer 200 are normally named in sequential order as represented by the spatial index 18. The entire tile-based pyramidal data (e.g. segmented images) is stored as the image pyramid 208 stored in the hierarchy, indexed format in the data store 16. The end product of the image pyramid 208 is created using the module 52 from the base tile 11 set for a given layer 200. Each image pyramid 208 may contain any number of sub-layers 200, each a reduction in level of detail of the previous sub-layer 200.

In FIG. 6, for example, the module 52 can build the image pyramid sub-layers 200 of varying resolution and details, such that at close distances to the camera viewpoint, the texture of the graphics data appears in its original full detail in the tiles 11 of the highest level of detail layer 200. For medium distances, a smaller texture of the graphics data that is half the resolution of the original layer 200 is used. Even further distances display texture of the graphics data that are a quarter the resolution of the previous layer 200 and so on. Each of these layers 200 can be referred to as a map level. Therefore, each of the map levels can be represented by one of the layers 200 in the data store 16, such that a plurality of layers 200 (each with a different level of detail) are used to represent the same spatial region (e.g. area of terrain modeled by the geographic data set 17). The above-described process can be used in mip-mapping on the cliend side, using camera viewpoints.

For example bilinear filtering or interpolation can be used in computer grapics to reduce "blockiness". This is a problem that arises in highly close-up views of computer generated objects. It is similar to using a magnifying glass to examine a newspaper closely. When the print is magnified, the dots that make up words start to become noticeable. Computer generated objects are wire frame models with texture maps wrapped around them to create surface detail [see texture mapping]. These texture maps are ordinary two dimensional graphic images. Unfortunately, when one zooms in too closely to a graphic image, its pixels become highly magnified and the image becomes "blocky". Bilinear filtering reduces pixilation (e.g. "blockiness") at the expense of resolution by taking 4 neighbouring pixels of the texture map [texels], and averaging between them. This gives a more gradual change in colour instead of the normally abrupt change. However, since bilinear filtering samples neighbouring pixels from a square area, it can only produce convincing results for surfaces at a right angle to the viewer. For angled or uneven surfaces, anisotropic filtering is required. Bilinear filtering can be used in production of the layers 200 with varying levels of detail.

Trilinear filtering can improve the quality of the map image by bilinear filtering between two levels for a given image. This filtering can create a smoother looking image where the texture is not a one-to-one mapping from texture to screen mapping. This filtering algorithm can be resident on the graphics system 32. Trilinear filtering can be used in production of the layers 200 with varying levels of detail. Further, it is recognized that some mip-map levels can be stored on the tiles 11, which can be used by the graphics hardware 32 when creating the texture rather than for the client application's use in the scene. The client application can be responsible for its own mip-maps.

Texture Request, Retrieval, and Creation

Client Request of Step 400

Figure 7:
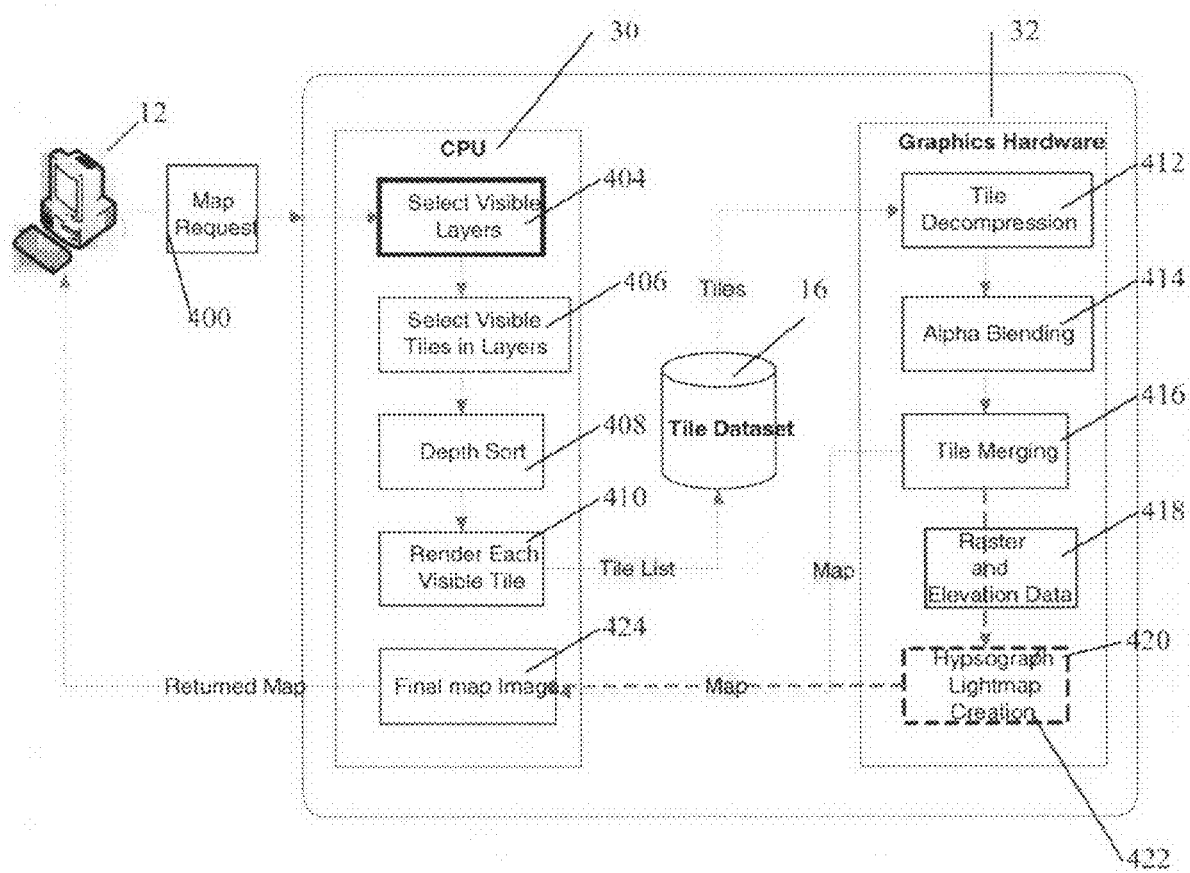
FIG. 7 shows an example operation of the data store manager of FIG. 3.

Referring to FIGS. 3 and 7, at step 400 the client applications 12 that require a map texture send the retrieval message 10 packets via TCP/IP, for example, to the data store manager 14 running on the local host system 100. Using TCP/IP, as well as other communication protocols and message passing interfaces, can allow the data store manager 14 to potentially be run in remote client/server architectures. The interface 108 via user events 109 can provide geographical coverage request parameters, such as but not limited to: a resolution or level of detail; a request priority; java compatibility flag; and optionally a list of layers 200 to display showing specific types of graphic information in the representative tile 70. Each of the requested layers 200 for combining can be altered, for example, for blend intensity; modulation type; blend order; minimum visible coverage; and maximum visible coverage. The communication messages 10,39 can be implemented as XML messages, as desired. Further, the applications 12 may additionally request a list of the available layers 200 and their blend parameters. If the application 12 request for a map omits the list of layers 200 to render, the data store manager 14 can use the default blend parameters for each layer 200. Further, elevation requests can additionally contain a request to return the minimum and maximum height values for a given request.

Step 402

Upon receiving the request for map data, the data store manager 14 queries each spatial index 18 and sorts the available layer 200 data, extracting the layer 200 definition from its associated metadata 202 file. For example, it is recognized that each layer 200 would have it's own unique index represented by the spatial index 18 (see FIG. 3) as an aggregation of the individual indicies.

Steps 404 and 406

Figure 8:
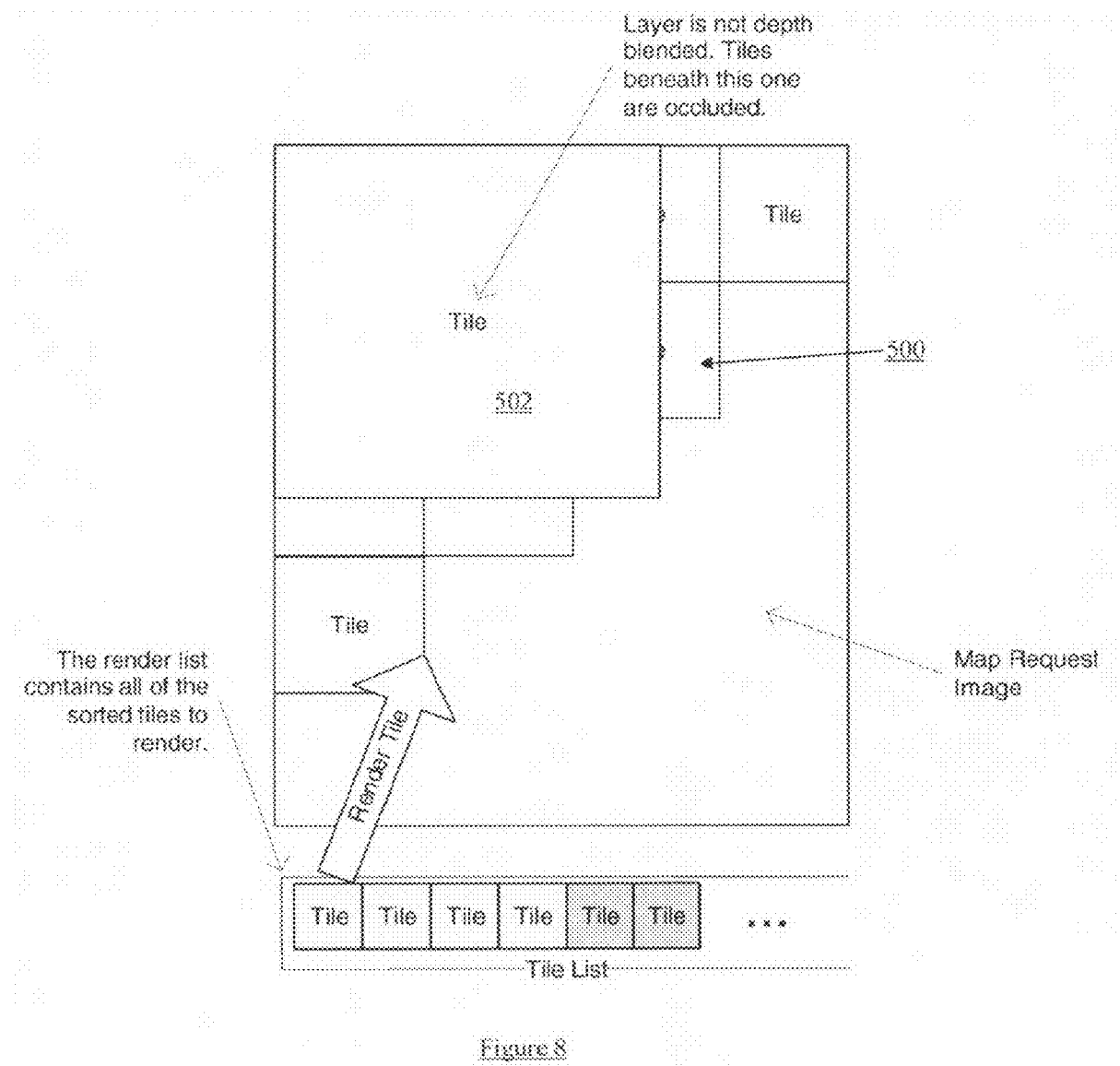
FIG. 8 shows an example of the visualization representation of FIG. 1 with occluded tiles.

The data store manager 14 then selects 404 the visible tiles 11 by pruning occluded layers (e.g. referring to FIG. 8 shows occluded tiles 500 under an opaque tile 502). Accordingly, if a layer's 200 tile 11 has alpha blending set to opaque and it completely occludes the tile 11 on the layer 200 beneath, the data store manager 14 uses the selected opaque tile 500 as the topmost data layer and ignores 406 all map data of the tiles 502 beneath it. This blending by the graphics system 32 in generating the representative tile 70 can significantly reduce the number of tiles 11 that need to be fetched from the data store 16 and represented in the representative tile 70.

Part of step 406 can include operation of the access module 53 to determine the allowed level of detail of the graphics data suitable for display on the visual interface 202. The access module 53 is used to determine permissions (e.g. according to application 12 identification information and/or user identification of the application 12 user—such as login and password information) of the application 12 submitting the request message 10. These permissions and/or level of detail (e.g. resolution) of the graphics data (of the tiles 11) can be contained in the request message 10, predefined by the system 8 in a corresponding permissions table and a level of detail table (not shown) accessible by the data store manager 14 and/or application 12, already known by the data store manager 14, or a combination thereof. Based on the determined permission(s), the data store manager 14 coordinates the content of the retrieval message 39 to contain the requisite level of detail in the combination of tiles 11 provided as the representative tile 70. It is recognized that the module 52 can coordinate the increase or decrease in the level of detail of the graphics data in the response message 10 by substituting one layer 200 for another, coordinating adding or subtracting layers to one another, coordinating substitution of selected tiles 11 in one layer 200 for other tiles 11 containing the desired/allowed level of detail, or a combination thereof. Further, it is recognized that the functionality of the access module 53 can be incorporated into that of the module 52, as desired.

Restricted access to the graphic detail contained in selected tiles 11 of the data store 16 by the access module 53 provides for handling and releasing such restricted data responsibly, according to the access criteria assigned in the metadata 202 associated with the restricted tiles 11. The access module 53 provides a mechanism to identify sensitive information content of the geospatial data set 17 and for monitoring what access to provide to such restricted data and still protect sensitive information, including procedures for identifying sensitive geospatial data in the geospatial data set 17 (e.g. through access criteria) and a methodology for making decisions whether to publish such data, the kind and quantity to release thereby, and the extent to which some of the data should be changed (e.g. through tile 11 substitution for tiles 11 having restricted access graphical data of a certain level of detail. Examples of restricted access graphical data can include such as but not limited to: business or personal productivity data; and data related to military significance, public health, public safety, or the government's regulatory functions. Further, the access module 53 can be used to coordinate the updating of the metadata 202 defining the access level of certain tiles 11 and their graphic data content as the restricted level of detail becomes unrestricted (e.g. the data store manager 14 would receive updates from an information access administrator (not shown) to modify the degree of access associated with certain tiles 11 and/or whole layers 200, as provided for in the metadata 202.

Step 408

Figure 9:
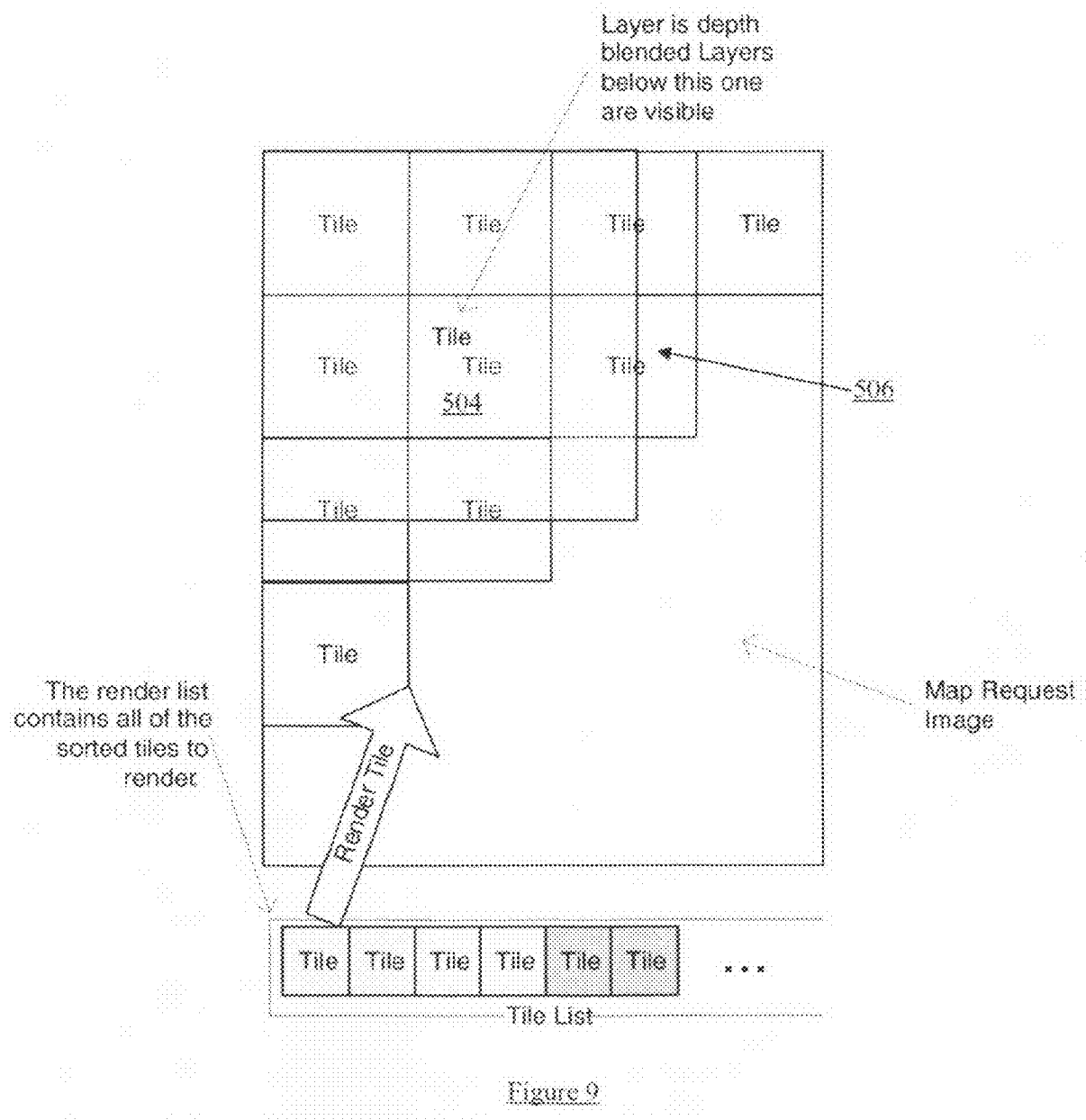
FIG. 9 shows an example of the visualization representation of FIG. 1 with translucent tiles.

If the layer 200 has a non-opaque alpha blending value, the data store manager 14 notes this so the graphics system 32 can later perform an alpha blending operation on each tile layer 200, compositing it with the layer 200 below (e.g. referring to FIG. 9 a translucent tile 504 is rendered so as to show all graphics data of tiles 506 situated under the tile 504). The resulting depth blended 504 or top-most occluding tiles 502 are used to comprise the representative tile 70 that is returned to the requesting application 12 at step 424.

Step 410

For graphics system 32 priming, the data store manager 14 initializes the graphics system 32 by sending it initial data to prepare for the pending texture creation via the texture module 56. This process can also include not creating any new texture, rather just rendering to an off-screen surface (e.g. in the frame buffer 58). This causes the graphics system 32 to size the view port of the representative tile 70 in accordance to the requesting application's 12 specifications in overall pixel size.

Step 412—Decompression of Tiles 11

The retrieved tiles 11 from the data store 16 are received by the graphics system 32 and decompressed, if compressed, using the DDS decompression scheme (DirectX Texture Compression for example) that is implemented in the graphics system 32.

Step 414—Alpha Blending

Alpha blending of tile layers 200 can be performed in the graphics system 32, for example using a standard Porter-Duff rules for digital image compositing, as described for example in Thomas Porter, Tom Duff, *Compositing Digital Images*, Computer Graphics 1984. Alpha blending is used by the spatial data store manager 14 via the computer graphics system 32 to create the effect of transparency in the visual representation 19 displayed on the visual interface 202 (see FIG. 1). Alpha blending combines a translucent foreground with a background colour to create an in-between blend for presentation in the visual representation 19. For animations, alpha blending can also be used to gradually fade one image into another. In computer graphics, an image can use 4 channels to define its colour, where it is recognized that images can be defined using less that 4 channels. Three of these are the primary colour channels—red, green and blue. The fourth, known as the alpha channel, conveys information about the image's transparency. It specifies how foreground colours should be merged with those in the background when overlaid on top of each other.

Step 416—Quad Creation (e.g. Creation of the Representative Tile 70)

The graphics system 32 creates a Direct X quad (i.e. 4×4 pixels), included in the representative tile 70, for example, in order to implement tile blending for each tile 11 in the tile set that is sent to the graphics system 32 for use in generation of the representative tile 70. For example, the frame buffer 58 size is set to the requested image size (included in the request message 10), and the data store manager 14 defines a view transform such that our world space (defined through the tiles 11 used from the data store 16) maps to screen space (defined by the visualization interface 202 for displaying the resultant representative tile 70). In this way, a quad defined as being 4×4 actually occupies 4×4 pixels. For example, DirectX can apply a DDS based image to this quad as a texture, thus making it the vehicle for rendering the tile 11 to an offscreen surface using the buffer 58. The graphics system 32 resources can be utilized by rendering images as a textured quad, meaning that the graphics hardware performs expensive filtering (e.g. bilinear) on the card, and uses its pixel shaders 60 to modify image results in hardware. A texel is a term used in computer graphics, the abbreviation of texture mapping pixel. Textures are made up of texels, just as a screen is made up of pixels. When drawing the image of the visualization representation 19, the graphics system 32 maps these texels to the screen. It is recognized that steps 414 and 416 can be thought of as drawing the tile 11,70 into the frame buffer 58.

Step 418—Elevation Data Handling

Elevation data, commonly known as a height map, supplies the relief data which is used to compute hypsograph and light map values, further described below. It can also be used by the client applications 12 to construct a 3D mesh for overlaying on the map composed by data store manager 14, thus providing elevation perception to the representative tile 70. For example, this height map can be stored in the memory 102 as a grayscale image, with a completely black pixel representing the lowest elevation, and a completely white pixel representing the highest elevation. Encoded in the data can be the maximum and minimum elevation values for that particular tile 11, allowing the system 8 to use the elevation data to interpolate the intermediate elevation values. While the original elevation data contains a 16-bit range of values (0-65536) between completely black and completely white, the data store manager 14 can reduce this number to an 8-bit range (0-256), for example, because current graphics hardware only supports 8-bit grayscale images. It is also recognized that other ranges can be used, for example 16-bit, where supported.

The elevation data for a tile 11 set can undergo a normalization process to account for the varying scales (height range) and biases (maximum and minimum height) for each tile 11. Because each tile 11 has interpolated its 256 intermediate elevation levels for its own scale and bias, the height map for adjacent tiles 11 would no longer be contiguous. This can be done by recording a global maximum and minimum bias for the current tile set, calculating a multiplication factor to normalize the data (e.g. scale and bias), and applying this factor to each pixel in the tile set. The normalization process can be greatly accelerated by using the graphics pipeline 50 to process the map data pixels as a stream.

Step 420—Hysographic Texture Creation

Figure 10:
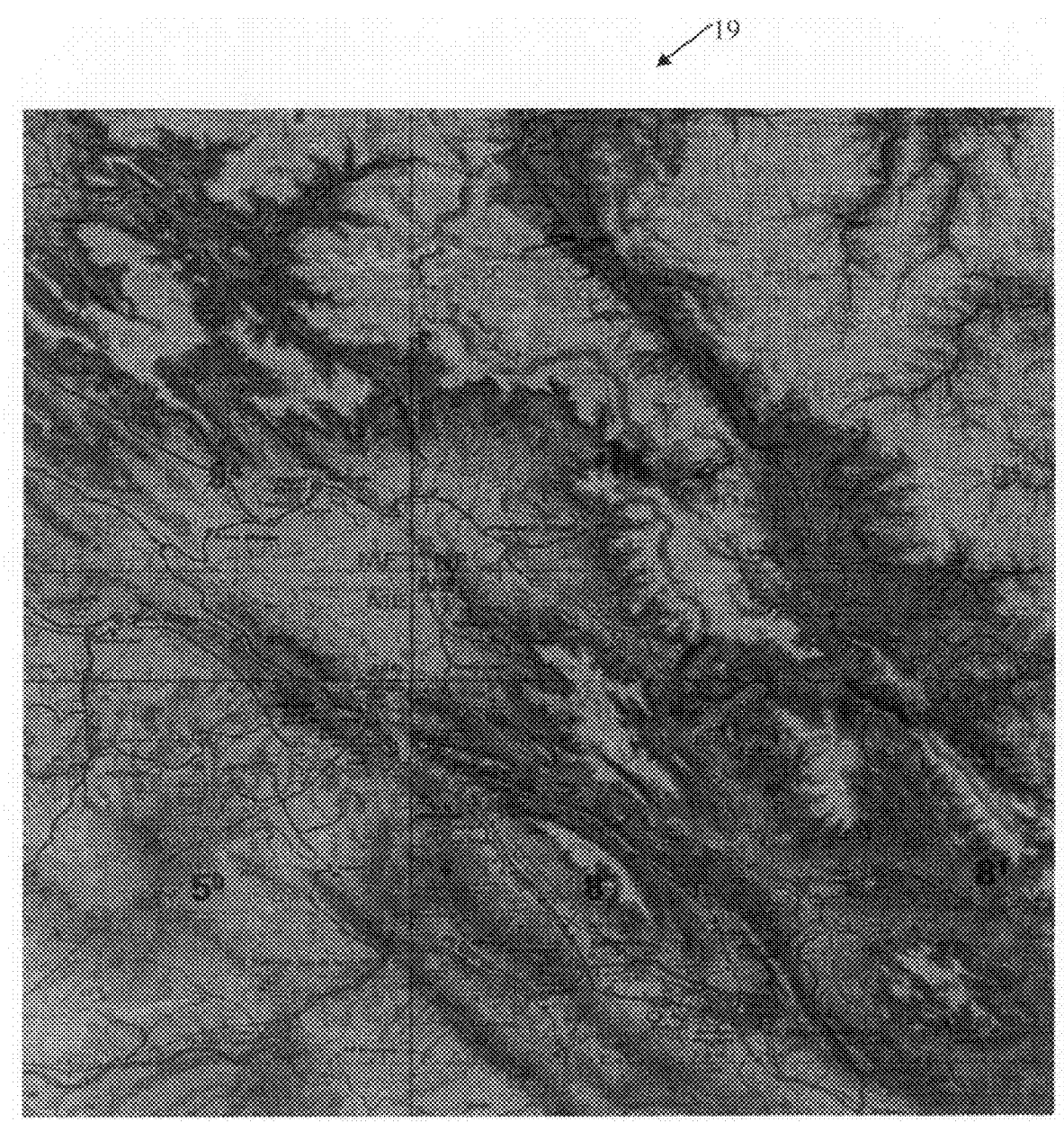
FIG. 10 is an example of hypsographic enhancement of a 2D terrain of the visualization representation of FIG. 1.
Figure 11:
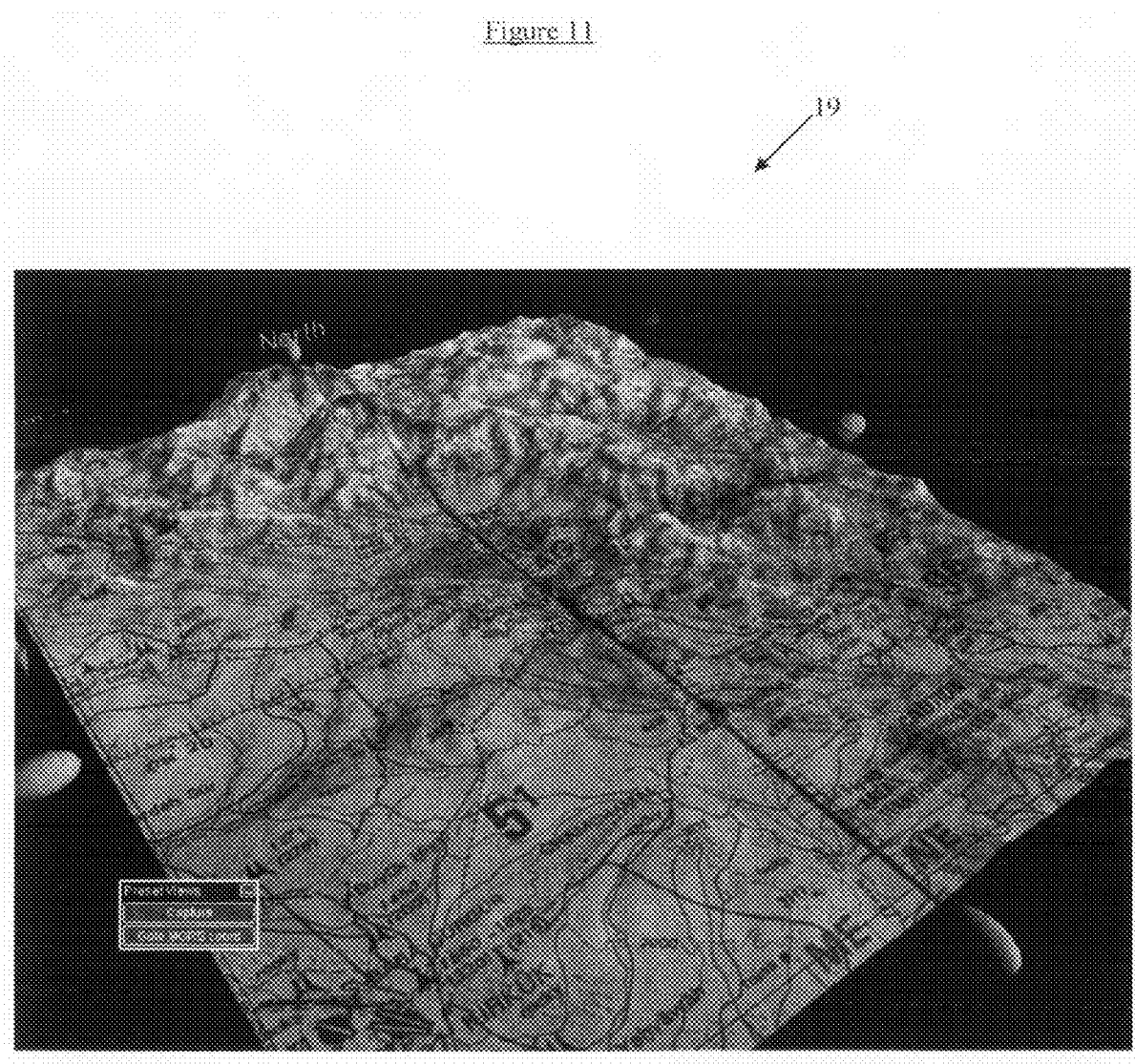
FIG. 11 is an example of hypsographic enhancement of a 3D terrain of the visualization representation of FIG. 1.

A hypsographic map is a visualization representation 19 showing the elevations and depressions of a terrain by directly mapping a color range to the elevation values of representative tile 70 on a pixel per pixel basis. Hypsographic maps can be used with 2D maps to represent a third dimension on a single plane (see FIG. 10). When coupled with a 3D terrain, the elevation effect is amplified (see FIG. 11). It is recognized that the Hypsographic Texture can be applied to any of the layers having various levels of detail.

Figure 12:
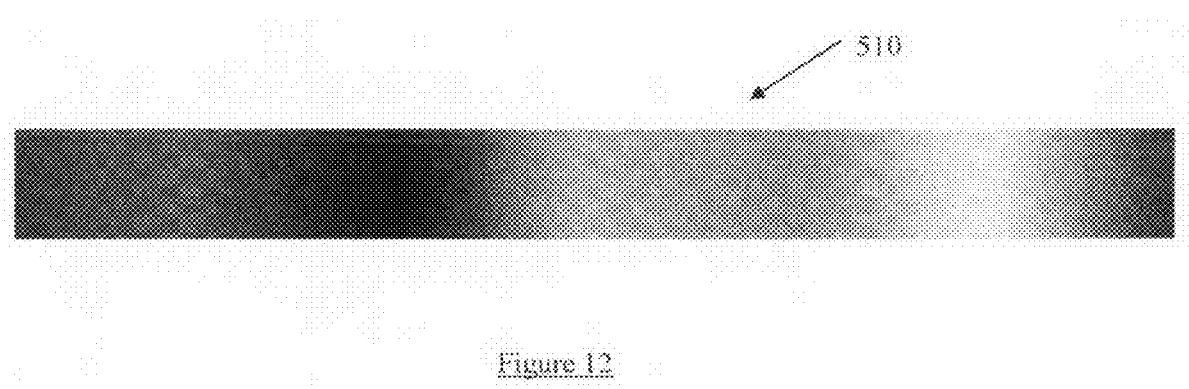
FIG. 12 is an example of a colour scale used in the hypsographic enhancements of FIGS. 10 and 11.

The data store manager 14 creates a hypsographic map texture by using the elevation data that accompanies each selected input tile 11. A color range 510 from 0-255 is provided, for example, corresponding to the 256 discrete increments in the elevation data (see FIG. 12). Instead of using the raster map data as the map's texture, the data store manager 14 uses the color range 510 as a lookup table for each pixel in the elevation data to create a new texture for use in the visualization representation 19.

Hypsographic creation is accelerated by taking advantage of the programmable pixel shader 60. The pixel shader 60 allows for shading operations to be applied to a stream of pixels on the graphics processor 32. Each shader 60 program can be implemented in the DirectX Shader language, for example. Rendering a hypsograph by the shader 60 for a given coverage region of the geographic data set 17 has the following steps, such as but not limited to:

1) Outside Shader 60
  1. Before rendering ensure the hypsographic color scale 510 is loaded (See FIG. 12);
  2. Render the height map to texture A, a selected texture value;
  3. Render the raster map to texture B, a selected texture value;
  4. Send Hypsographic Color Scale, Texture A, Texture B, and an intensity variable to shader 60 algorithm;
  5. Run Shader 60 algorithm; and
  6. Copy Rendered Texture from shader 60 algorithm output buffer 58.

2) Example Shader Algorithm

For each pixel coordinate p in output image:
  a. Let h be the value at coordinate p in heightmap texture A;
  b. Let c1 be the color at coordinate (0,h) in the hypsographic Colour scale Texture;
  c. Let c2 be the color at the coordinate p in the raster texture B; and
  d. Composite c1 and c2 into c3 by linear interpolating between the two colors by the intensity value and place into output buffer at p.

It is recognized in the above step 420 that the described variables can be selected by the application 12 and/or predefined by the data store manager 14, as desired.

Step 422—Light Map Generation

A light map applies shading to a 2D map so as to simulate the lighting effects that occur on a 3D terrain, on a pixel per pixel basis of the tiles 11 included in the representative tile 70. When viewing a 2D map, it can be difficult to understand the various contours of the terrain surface, due to the lack of height information. Even with topographic maps, the effect is quite limited. Instead, data store manager 14 coordinates the computation of the shading levels that occur when the map image data is stretched over a 3D terrain. The shading levels are then composited onto the 2D map though use of the shader 60, giving the viewer of the visualization representation 19 a better understanding of the elevations and depressions of the terrain included in the geographic data set 17. It is recognized that the Light map Generation can be applied to any of the layers having various levels of detail.

Light map generation can be performed by using the programmable pixel shader 60, similar to the hypsograph creation. Rendering a height map uses the following steps, such as but not limited to:

1) CPU Algorithm
  1. Render the height map to texture A, a selected texture value;
  2. Render the raster map to texture B, a selected texture value;
  3. Send Height map texture A, Raster map texture B, a light direction L, and an intensity i to shader 60 algorithm;
  4. Run Shader 60 algorithm; and
  5. Copy Rendered Texture from shader 60 algorithm output buffer 58.

2) Shader Algorithm

For each pixel at coordinate p in output image:
  a. Calculate the normal n at pixel p in height map texture A (Normal can be calculated by using neighboring pixels or additionally pre-calculated normal map instead of a heightmap);
  b. Use shader 60 instruction lit to calculate lighting color c1, requires light direction L, intensity i, and normal n; and
  c. Composite pixel at p in raster image texture B and light map color c1 into output buffer at pixel p.

It is recognized in the above step 422 that the described variables can be selected by the application 12 and/or predefined by the data store manager 14, as desired.

Step 424—Texture Return

The DirectX quads are rendered into an off-screen surface, which is then returned at step 424 to the processor 30 from the graphics system 32 via the pipeline 50. If the client application wants to retrieve the merged elevation data, it is specifically requested in another call, for example.

Accordingly, the above-described system 8 includes the spatial data store manager 14 (e.g. for GIS—Geographic Information Systems) for providing a map delivery system 8 that is preferably transparent to the user of the client application 12 and does not overly occupy the processor 30 resources. The system 8 can take advantage of the computer's graphics system 32 by offloading computationally intensive functions of the map delivery system 8 to the graphics system 32, such that the processor 30 is free to perform other tasks related to functioning of the application 12 and thereby helping to minimize the computation imposition on the user of the associated graphics processing. It is recognised that the data store manager 14 can be used to provide the image tiling techniques for Web-based 3D visualization environments with respect to interactive Web applications 12. The use of tiled 11 images for combining to generate the representative tile 70 helps to improve the application 12 performance by allowing the application 12 to process an image region of the geographic data set 17 using a selected number of tiles 11 and/or layers 200 without bringing an excessive amount of individual tiles 11 and associated information into computer memory 102 hosting the application 12. The data store manager 14 coordinates pruning of the tile 11 set by using stored image pyramids 208 when looking at a large area of the scene, and uses the spatial index 18 to determine viewable tiles 11 based on the acceptable level of detail suitable for rendering the visualization representation 19. The applicable tiles 11 from the data store 16, as well as any dynamic modifications to the tile(s) content, is combined by the graphics system 32 to generate the representative tile 70 for sending in the retrieval message 39.

Further, it is recognized that the data store manager 14 is applicable to compose maps (e.g. visualization representation 19) requested by the client application 12 using tile-based techniques, where the tiles 11 are regions of the map data that have been segmented into a plurality of squares (or other shaped regions of the geographic data set 17). Accordingly, instead of loading an entire map to the application 12 in order to view a small region of interest on the visual interface 202, only the required tiles 11 with the appropriate level of detail(s) (i.e. selected spatial portions of the entire map) are acquired by the data store manager 14, are modified where needed and combined to generate the representative tile 70, which is then sent to the application 12. Further, it is recognized that multiple types of map data may be layered on top of one another through the use of different categories of the layers 200 in order to provide configurable multiple levels of detail for a single geographic region and customization in the presentation of the graphics data on the visual interface 202. For example, the client application 12 can select multiple levels to be composited using a technique known as alpha blending, further described below, which can be applied to hypsograph and/or light map applications.

We claim:

1. A system for assembling graphics information as a graphics display for presentation on a visual interface, the graphics information including a plurality of image portions stored in a data store, the system comprising:
    a management module for receiving a graphics request message and for coordinating processing of a selected number of the image portions to generate at least one representative image portion as the graphics display in response to the graphics request message; and
    a graphics system coupled to the management module for receiving processing information from the management module to facilitate access to the selected number of the image portions and for processing them as a combination to generate the least one representative image portion, the graphics system including graphics hardware configured for processing the graphics information.

2. The system of claim 1 further comprising a frame store for storing the at least one representative image portion as a merged combination of the selected number of the image portions.

3. The system of claim 2, wherein the frame store is part of the graphics hardware.

4. The system of claim 2, wherein the image portions are represented as image tiles and the at least one representative image portion is generated as a single representative image tile.

5. The system of claim 2 further comprising a pixel shader module for adjusting texture of the selected number of the image portions during processing by the graphics system, the pixel shader module being part of the graphics hardware.

6. The system of claim 5, wherein the texture is adjusted to include additional graphics detail in the at least one representative image portion selected from the group comprising a hypsograph and a light map.

7. The system of claim 5, wherein the graphics information includes information selected from the group comprising: a selected geographic region; three-dimensional visual characteristics including terrain elevation details and elevation details; a selected display resolution; and alpha-numeric information and other graphical symbols for overlay on a desired geographic region.

8. The system of claim 2, wherein the frame store is configured as tile-based pyramidal data referenced in an associated hierarchical indexed format, the image portions stored as a plurality of image tiles in respective layers.

9. The system of claim 8 further comprising at least two of the layers in the frame store having different resolutions.

10. The system of claim 2 further comprising an access module coupled to the management module for coordinating the access to restricted content of the plurality of image portions stored in the frame store.

11. A method for assembling graphics information as a graphics display for presentation on a visual interface, the graphics information including a plurality of image portions stored in a data store, the method comprising the steps of:
    receiving a graphics request message;
    providing processing information for coordinating processing of a selected number of the image portions for inclusion in at least one representative image portion as the graphics display in response to the graphics request message; and
    accessing the selected number of the image portions and processing them as a combination to generate the least one representative image portion through use of graphics hardware configured for processing the graphics information.

12. The method of claim 11 further comprising the step of storing the at least one representative image portion as a merged combination of the selected number of the image portions in a frame store.

13. The method of claim 12, wherein the frame store is part of the graphics hardware.

14. The method of claim 12, wherein the image portions are represented as image tiles and the at least one representative image portion is generated as a single representative image tile.

15. The method of claim 12 further comprising the step of adjusting texture of the selected number of the image portions during graphics processing.

16. The method of claim 15, wherein the texture is adjusted to include additional graphics detail in the at least one representative image portion selected from the group comprising a hypsograph and a light map.

17. The method of claim 15, wherein the graphics information includes information selected from the group comprising: a selected geographic region; three-dimensional visual characteristics including terrain elevation details and elevation details; a selected display resolution; and alphanumeric information and other graphical symbols for overlay on a desired geographic region.

18. The method of claim 12, wherein the frame store is configured as tile-based pyramidal data referenced in an associated hierarchical indexed format, the image portions stored as a plurality of image tiles in respective layers.

19. The method of claim 18 further comprising the step of accessing at least two of the layers in the frame store having different resolutions.

20. The method of claim 12 further comprising the step of coordinating access to restricted content of the plurality of image portions stored in the frame store.

* * * * *